(12) United States Patent
Kahle et al.

(10) Patent No.: US 9,733,434 B2
(45) Date of Patent: *Aug. 15, 2017

(54) DEVICE FOR AN OPTICAL-FIBER CONNECTION

(71) Applicant: CommScope Technologies LLC, Hickory, NC (US)

(72) Inventors: Eberhard Kahle, Hoppegarten (DE); Anne Kramer, Berlin (DE); Jörg Adomeit, Berlin (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,500

(22) Filed: Jun. 27, 2016

(65) Prior Publication Data

US 2017/0023745 A1    Jan. 26, 2017

Related U.S. Application Data

(63) Continuation of application No. 14/638,875, filed on Mar. 4, 2015, now Pat. No. 9,377,590, which is a continuation of application No. 14/166,495, filed on Jan. 28, 2014, now Pat. No. 8,985,861, which is a continuation of application No. 13/655,017, filed on
(Continued)

(30) Foreign Application Priority Data

May 3, 2002    (DE) .................... 102 19 935

(51) Int. Cl.
*G02B 6/38*    (2006.01)

(52) U.S. Cl.
CPC .......... *G02B 6/3825* (2013.01); *G02B 6/387* (2013.01); *G02B 6/3831* (2013.01); *G02B 6/3865* (2013.01); *G02B 6/3874* (2013.01); *G02B 6/3897* (2013.01); *G02B 6/381* (2013.01); *G02B 6/3873* (2013.01); *G02B 6/3893* (2013.01); *Y10T 29/49208* (2015.01); *Y10T 29/49826* (2015.01)

(58) Field of Classification Search
CPC .. G02B 6/3825; G02B 6/3831; G02B 6/3865; G02B 6/3874; G02B 6/387; G02B 6/3897; G02B 6/381; G02B 6/3873; G02B 6/3893; Y10T 29/49208; Y10T 29/49826
USPC ... 385/53, 56, 58–60, 66, 69, 76–78, 88, 92, 385/139
See application file for complete search history.

(56) References Cited

U.S. PATENT DOCUMENTS 5,067,783 A    11/1991    Lampert
5,210,810 A    5/1993    Darden et al.
(Continued)

FOREIGN PATENT DOCUMENTS

EP    0 731 369    9/1996
JP    2000-266963    9/2000
JP    2001-033658    2/2001

*Primary Examiner* — Thomas A Hollweg
*Assistant Examiner* — Guy Anderson
(74) *Attorney, Agent, or Firm* — Merchant & Gould P.C.

(57) ABSTRACT

Device for the coaxial connection of fiber-optic cables, comprising a single-piece coupling housing (10) and a single-piece sleeve mount (20), the sleeve mount (20) being designed with at least one latching nose (21) and the coupling housing (10) being designed with at least one latching mount which complements the at least one latching nose (21), wherein the latching mount is designed with at least one latching hook (14) and at least one stop (15).

16 Claims, 2 Drawing Sheets

Related U.S. Application Data

Oct. 18, 2012, now Pat. No. 8,636,422, which is a continuation of application No. 13/367,778, filed on Feb. 7, 2012, now Pat. No. 8,313,248, which is a continuation of application No. 12/983,699, filed on Jan. 3, 2011, now Pat. No. 8,123,415, which is a continuation of application No. 12/062,704, filed on Apr. 4, 2008, now Pat. No. 7,862,243, which is a continuation of application No. 10/513,207, filed as application No. PCT/EP03/04292 on Apr. 25, 2003, now Pat. No. 7,377,697.

(56) References Cited

U.S. PATENT DOCUMENTS

| | | | |
|---|---|---|---|
| 5,317,663 A | 5/1994 | Beard et al. | |
| 5,542,015 A | 7/1996 | Hultermans | |
| 5,737,464 A * | 4/1998 | Underwood | G02B 6/3825 385/58 |
| 5,838,855 A | 11/1998 | Stephenson | |
| 5,887,095 A | 3/1999 | Nagase et al. | |
| 5,915,058 A | 6/1999 | Clairardin et al. | |
| 6,081,647 A | 6/2000 | Roth et al. | |
| 6,154,597 A | 11/2000 | Roth | |
| 6,367,984 B1 | 4/2002 | Stephenson et al. | |
| 6,508,593 B1 | 1/2003 | Farnsworth et al. | |
| 6,752,538 B1 | 6/2004 | Bates, III | |
| 6,821,024 B2 * | 11/2004 | Bates, III | G02B 6/3893 385/76 |
| 7,377,697 B2 | 5/2008 | Kahle et al. | |
| 7,862,243 B2 | 1/2011 | Kahle et al. | |
| 8,123,415 B2 | 2/2012 | Kahle et al. | |
| 8,313,248 B2 | 11/2012 | Kahle et al. | |
| 8,382,382 B2 | 2/2013 | Nelson | |
| 8,636,422 B2 * | 1/2014 | Kahle | G02B 6/3825 385/53 |
| 8,845,205 B2 | 9/2014 | Nelson | |
| 8,985,861 B2 * | 3/2015 | Kahle | G02B 6/3825 385/58 |
| 9,377,590 B2 * | 6/2016 | Kahle | G02B 6/3825 |
| 2003/0156797 A1 | 8/2003 | Gheradini | |
| 2006/0093274 A1 | 5/2006 | Kahle et al. | |
| 2010/0054668 A1 | 3/2010 | Nelson | |
| 2010/0111484 A1 | 5/2010 | Allen | |
| 2011/0229082 A1 | 9/2011 | Kahle et al. | |
| 2013/0177279 A1 | 7/2013 | Nelson | |
| 2013/0183018 A1 | 7/2013 | Holmberg | |
| 2014/0286608 A1 | 9/2014 | Kahle et al. | |
| 2015/0013889 A1 | 1/2015 | Nelson | |

* cited by examiner

DEVICE FOR AN OPTICAL-FIBER CONNECTION

This application is a continuation of application Ser. No. 14/638,875, filed 4 Mar. 2015, now U.S. Pat. No. 9,377,590, which is a continuation of application Ser. No. 14/166,495, filed 28 Jan. 2014, now U.S. Pat. No. 8,985,861, which is a continuation of application Ser. No. 13/655,017, filed 18 Oct. 2012, now U.S. Pat. No. 8,636,422, which is a continuation of application Ser. No. 13/367,778, filed 7 Feb. 2012, now U.S. Pat. No. 8,313,248, which is a continuation of application Ser. No. 12/983,699, filed 3 Jan. 2011, now U.S. Pat. No. 8,123,415, which is a continuation of application Ser. No. 12/062,704, filed 4 Apr. 2008, now U.S. Pat. No. 7,862,243, which is a continuation of application Ser. No. 10/513,207, filed 1 Sep. 2005, now U.S. Pat. No. 7,377,697, which is the National Stage of Application PCT/EP03/04292, filed 25 Apr. 2003, which claims benefit of Ser. No. 102 19 935.3, filed 3 May 2002 in Germany, and which applications are incorporated herein by reference. To the extent appropriate, a claim of priority is made to each of the above disclosed applications.

BACKGROUND

The invention relates to a device for a coaxial optical-fiber connection, comprising a sleeve mount and a coupling housing for accommodating the sleeve mount.

It is known for optical fibers to be connected coaxially by coupling. The optical-fiber ends which are to be connected are designed with plug-in connectors, which are accommodated by the coupling. The plug-in connectors are designed with ferrules, which are worked in a highly precise manner and are introduced into a sleeve of the corresponding coupling such that their end surfaces come into contact. The sleeve is mounted in a sleeve mount. For accommodating the plug-in connectors, the sleeve mount is designed, for example, with latching hooks at the two ends. The outer shape of the coupling housing is defined by way of the given geometries of known installation openings. It is known, for easy production and installation, for the coupling housing to be configured in two parts, preferably with two identical housing halves. In order to prevent any possible gap formation between the two housing halves, the latter are, for example, welded.

U.S. Pat. No. 5,317,663 discloses a coupling housing for accommodating a two-part sleeve mount, the coupling housing comprising a basic body and a housing wall designed as a cover. Grooves are made in the basic body of the coupling housing, it being possible for complementary tongues, which are formed on the sleeve mount, to be inserted into said grooves. The displacement of the connecting seam here is favorable for the stability of the coupling. The configuration, however, requires at least two different molds for producing the basic body and the cover.

The Japanese patent application JP2000266963 has disclosed a single-piece coupling housing into which a single-piece sleeve mount can be inserted. The sleeve mount is designed with latching noses, which latch into complementary through-passages on the coupling housing. The through-passages on the coupling housing can be produced cost-effectively. However, the weakening of the coupling housing in the contact region of the plug-in connectors as well as the penetration of dust are disadvantageous.

SUMMARY

The invention is based on the technical problem of providing a device which is intended for a coaxial optical-fiber connection, comprising a coupling housing and a sleeve mount, and, with a small number of parts, has a high level of stability.

A single-piece sleeve mount can be latched into a single-piece coupling housing, the latching mount on the coupling housing being designed with at least one latching hook and at least one stop. A coupling with the coupling housing and the sleeve mount being designed in one piece, in each case, has a higher level of stability in comparison with the couplings of two-part design. The single-piece embodiment of the coupling housing prevents any possible gap formation in the contact location of two housing halves. It is possible for the coupling housing to be formed in a single mold. There is no need for any locking elements or similar additional parts for a latching fastening of the sleeve mount in the coupling housing. The use of a latching fastening, in addition, is suitable for automated installation. It is possible for the latching mount to be formed in the coupling housing without through-passages in the coupling housing.

In a preferred embodiment, the stop and latching hook of the latching mount do not have any undercut. This allows a cost-effective design of the mold and precise follow-up work on the contact surfaces without any special tools being used.

In a development, the latching hook is designed with a slope, which serves as an installation aid. The angle may be selected in accordance with the required load-bearing force of the latching mount and in order to be suitable for maximum admissible forces during the joining operation.

In a further embodiment, the latching mount of each latching nose comprises two stops and one latching hook, the latching hook being arranged between the stops. The arrangement allows the latching nose of the sleeve mount to be accommodated in a stable manner. A design comprising two latching hooks and one centrally located stop is also conceivable in order for the latching nose to be accommodated in a stable, non-tilting manner. However, for production reasons, the embodiment with two stops and one latching hook is preferred.

In a further embodiment, the latching fastening is designed with two latching mounts on mutually opposite housing walls. The embodiment with two latching mounts allows stable attachment. For installation of the sleeve mount in the coupling housing, temporary deformation of the housing is necessary in order to allow passage beyond the projecting latching-hook geometry. It is advantageous here if the housing has a relatively small accumulation of material at this location. The housing is usually designed with flanges on the outsides of two mutually opposite housing walls, for attachment to a front panel, with the result that, in the case of this embodiment, the latching mounts are preferably made on the insides of the other two housing walls.

Specific applications require a connection piece which serves, for example, as a protective device against the emission of laser light. In order to prevent any change in the outer dimensions of the coupling, which are defined by way of the given installation openings, any possible connection piece may be attached to the coupling housing by an additional inner latching fastening. The formation of the latching sockets for the sleeve mounts on two mutually opposite housing walls makes it possible for the additional latching fastening to be formed on the other two housing walls. The task of forming the latching fastening for the connection piece does not have any adverse effect on the task of forming the latching mounts for the sleeve mount.

BRIEF DESCRIPTION OF THE DRAWINGS

The invention is explained in more detail hereinbelow with reference to a preferred exemplary embodiment. In the figures.

DETAILED DESCRIPTION

Figure 1:
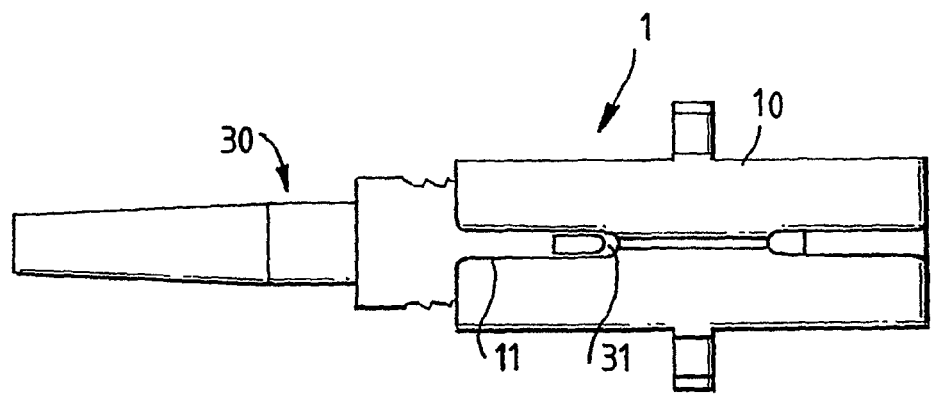
FIG. 1 shows a schematic illustration of a coupling for coaxial optical-fiber connection.

FIG. 1 shows, schematically, a coupling 1 for the coaxial connection of fiber-optic cables. The coupling 1 comprises a coupling housing 10, in which a concealed sleeve mount 20 is mounted. The end of a fiber-optic cable is designed with a plug-in connector 30, which can be accommodated in the coupling 1 on both connection sides of the concealed sleeve mount 20. The coupling housing 10 is designed with a groove 11. For a good orientation and/or positioning of the plug-in connector 30 in the coupling 1, the plug-in connector 30 is designed with a complementary tongue 31.

Figure 2:
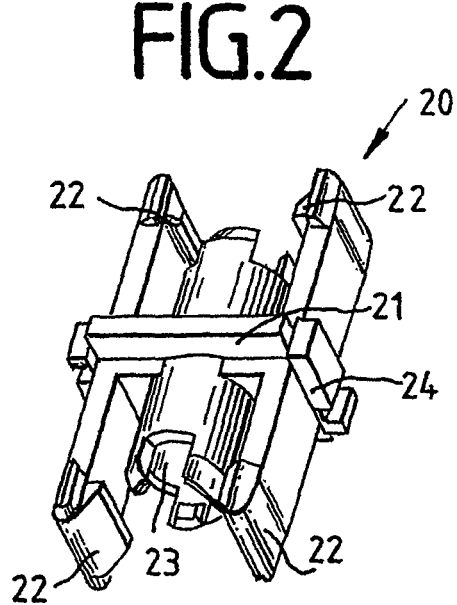
FIG. 2 shows a perspective view of a sleeve mount.

FIG. 2 shows a perspective illustration of the sleeve mount 20. The sleeve mount 20 is designed with a latching nose 21, latching hooks 22, an axial bore 23, and a spacer 24. The latching nose 21 is part of a latching fastening for fixing the sleeve mount 20 in the coupling housing 10, which is illustrated in FIG. 1. The cross section of the latching nose 21 is preferably of rectangular design. This provides for a both straightforward production and a high loading capability of the associated latching fastening. The latching hooks 22 serve for accommodating the plug-in connector 30, which is illustrated in FIG. 1. In order for the plug-in connector 30 to be accommodated by the latching hooks 22, the latching hooks 22 need to move. The sleeve mount 20 is thus to be mounted in the coupling housing 10 (not illustrated in FIG. 2), such that this movement is not obstructed, and a plug-in connector 30 can be accommodated by the latching hooks 22. In addition, good lateral guidance of the sleeve mount 20 in the coupling housing 10 is required. For this purpose, spacers 24 are provided on the sleeve mount 20. The contact location of two plug-in connectors 30 connected by the coupling 1 is located in a sleeve which is not illustrated but can be inserted into a bore 23 of the sleeve mount 20. The material of the sleeve may be selected here in accordance with the connection-quality requirements.

Figure 3:
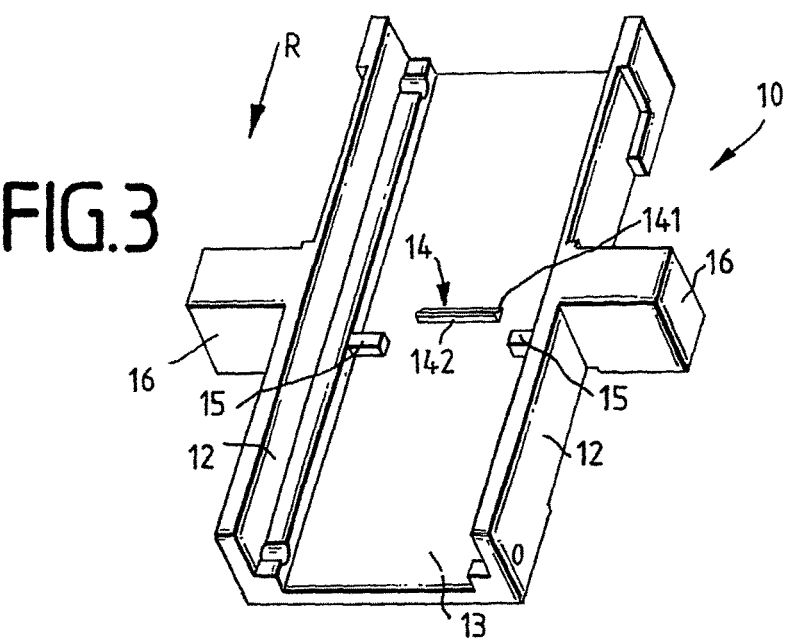
FIG. 3 shows a perspective view of a cut-open coupling housing.

FIG. 3 shows a perspective illustration of the cut-open coupling housing 10. The coupling housing 10 is designed with flanges 16 on the outsides of two housing walls 12, it being possible for the coupling housing 10 to be attached to a front panel (not used) by means of said flanges. A rectangular through-passage for accommodating the sleeve mount 20, which is illustrated in FIG. 2, is made in the coupling housing 10. In each case, one latching mount, comprising a latching hook 14 and two stops 15, is made on one housing wall 13 and on the opposite housing wall (not illustrated). The latching nose 21 of the sleeve mount 20, said latching nose being illustrated in FIG. 2, can be fixed between the latching hook 14 and the stops 15. The sleeve mount 20 can be installed automatically in the latching direction R in the single-piece coupling housing 10. The latching hook 14 is designed with a slope 141 for the purpose of assisting the latching-in operation. Easy definition of the coupling housing 10 is necessary in the latching operation in order to allow passage beyond the latching hook 14. The housing walls 12 have an accumulation of material in this region on account of the flanges 16 which are usually present. The latching mounts are thus preferably formed on the housing walls 13. By the avoidance of any undercuts, the coupling housing 10 can be produced cost-effectively as a plastic injection molding using a single mold. The contact surfaces 151 of the stops 15, said surfaces being concealed in FIG. 3, can be worked in a precise manner by way of access in the latching direction R. A contact surface 142 of the latching hook 14 can be worked by way of access counter to the latching direction R. There is thus no need for any special tool for follow-up work on the contact surfaces 142, 151.

Figure 4:
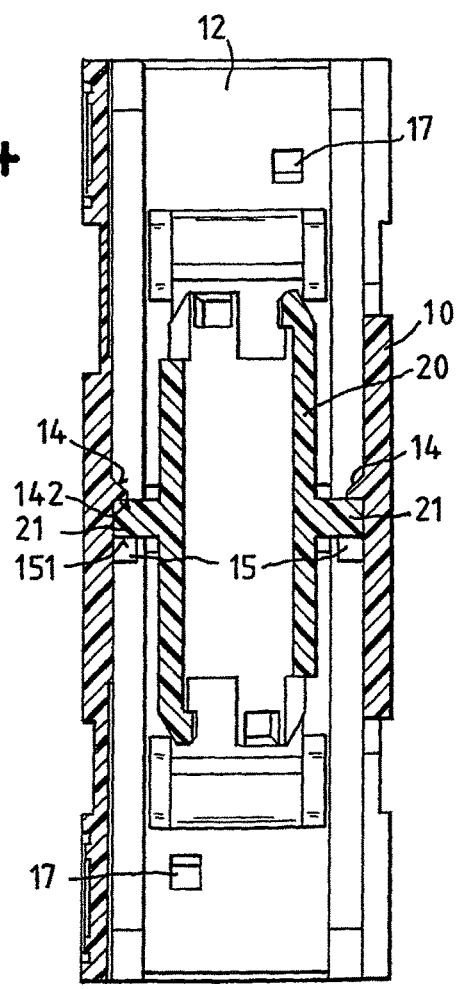
FIG. 4 shows a sectional illustration of the coupling housing with the sleeve mount installed.

FIG. 4 shows the coupling housing 10 with a sleeve mount 20 installed. The designations here correspond to the preceding figures. The sleeve mount 20 is fixed between the latching hook 14 and the stops 15 via the latching nose 21. The fixing of the sleeve mount 20 does not require any further locking elements. The contact surfaces 142, 151 of the latching mount may be produced in a precise manner, with the result that play is avoidable.

The outer shape of the coupling 1 is determined by way of the given geometry of an installation opening, and it is only the length of the coupling 1 which can be varied within limits. For example, it is possible for the coupling housing 10 to be extended by a connection piece, which provides protection against the emission of laser radiation. In addition, it is also conceivable for dust-protection devices to be positioned on the coupling housing 10 when the plug-in connector 30 is subjected to pulling. For accommodating a connection piece, the housing walls 12 are designed with additional latching noses 17 at terminations of the coupling housing 10. The task of forming the latching noses 17 does not adversely affect the task of forming the latching mount for the sleeve mount. In order to avoid undercuts, the latching noses 17 are arranged in a diagonally offset manner.

LIST OF DESIGNATIONS 1 coupling
10 coupling housing
11 groove
12 housing wall
13 housing wall
14 latching hook
141 slope
142 contact surface
15 stop
151 contact surface
16 flange
17 latching nose
20 sleeve mount
21 latching nose
22 latching hook
23 bore
24 spacer
30 plug
31 tongue

What is claimed is:

1. A fiber optic coupling for interconnecting first and second fiber optic connectors in coaxial alignment, each connector including a generally cylindrical ferrule holding an end of an optical fiber, the coupling comprising:
   a coupling housing including an axial passage defined by a top wall, a bottom wall, a right wall, and a left wall, the axial passage extending between a first opening defined at a first end of the coupling housing and a second opening defined at a second end of the coupling housing, the first end configured to receive the first fiber optic connector through the first opening and the second end configured to receive the second fiber optic connector through the second opening for mating with the first fiber optic connector; and a ferrule alignment structure located within the axial passage, the ferrule alignment structure including a sleeve mount defining a first end, a second end, and a center portion, wherein the first end of the sleeve mount is positioned toward the first end of the coupling housing and the second end of the sleeve mount is positioned toward the second end of the coupling housing, the sleeve mount further defining an axial bore that defines a longitudinal axis extending from the first end of the sleeve mount toward the second end of the sleeve mount, the axial bore configured to receive and coaxially align the ferrules of the first and second fiber optic connectors when the connectors are inserted into the fiber optic coupling, wherein the sleeve mount includes a first portion extending from the center portion of the sleeve mount toward the first end of the sleeve mount and a second portion extending from the center portion of the sleeve mount toward the second end of the sleeve mount, each of the first and second portions defining an end with an inwardly extending lip for capturing a ferrule sleeve within the axial bore, wherein the sleeve mount including the inwardly extending lip at the end of each of the first and second portions is a unitarily molded structure.

2. A fiber optic coupling according to claim 1, wherein the inwardly extending lip at the end of the first portion is defined by an inwardly extending finger of the first portion that is positioned around the axial bore at a peripherally offset relationship with respect to an inwardly extending finger of the second portion defining the inwardly extending lip at the end thereof along the longitudinal axis defined by the axial bore.

3. A fiber optic coupling according to claim 1, wherein the sleeve mount is removably inserted into the coupling housing.

4. A fiber optic coupling according to claim 3, wherein the sleeve mount and the coupling housing are configured such that the sleeve mount is inserted into the axial passage of the coupling housing in a direction parallel to the longitudinal axis.

5. A fiber optic coupling according to claim 1, wherein the fiber optic coupling is configured for interconnecting two SC type fiber optic connectors in coaxial alignment.

6. A fiber optic coupling according to claim 1, wherein the coupling housing defines a mounting flange outwardly protruding from each of the right wall and the left wall.

7. A fiber optic coupling according to claim 1, wherein the sleeve mount is configured such that the ferrule sleeve is inserted into the sleeve mount in a direction along the longitudinal axis.

8. A fiber optic coupling according to claim 2, wherein at least one of the first portion and the second portion of the sleeve mount defines flexible arms defined around the axial bore of the sleeve mount for receiving a ferrule sleeve, the flexible arms configured to flex out radially to receive the ferrule sleeve into the axial bore.

9. A fiber optic coupling according to claim 8, wherein the at least one portion defines three of the flexible arms.

10. A fiber optic coupling according to claim 8, wherein the flexible arms extend in a direction from the center portion of the sleeve mount toward at least one of the first end and the second end of the sleeve mount.

11. A fiber optic coupling according to claim 10, wherein the inwardly extending fingers are positioned on the flexible arms.

12. A fiber optic coupling according to claim 1, wherein the top wall of the coupling housing defines a keying groove at each of the first and second ends thereof configured to intermate with complementary keying tongues of the first and second fiber optic connectors to orient the first and second fiber optic connectors in a correct orientation.

13. A fiber optic coupling according to claim 1, wherein the sleeve mount includes two latching hooks extending from the center portion of the sleeve mount toward the first end of the coupling housing and two latching hooks extending from the center portion of the sleeve mount toward the second end of the coupling housing, wherein the latching hooks extending toward the first end of the coupling housing are positioned on opposite sides of the axial bore and are configured to flex toward and away from each other to releasably latch the first fiber optic connector to the fiber optic coupling and the latching hooks extending toward the second end of the coupling housing are positioned on opposite sides of the axial bore and are configured to flex toward and away from each other to releasably latch the second fiber optic connector to the fiber optic coupling.

14. A fiber optic coupling according to claim 13, wherein the latching hooks include inwardly extending portions configured to engage the first and second fiber optic connectors.

15. A fiber optic coupling according to claim 2, wherein each of the first portion and the second portion of the sleeve mount includes three inwardly extending fingers.

16. A fiber optic coupling according to claim 1, further comprising a ferrule sleeve within the axial bore of the sleeve mount.

* * * * *